(12) United States Patent  
Kukulj

(10) Patent No.: US 9,280,237 B2  
(45) Date of Patent: Mar. 8, 2016

(54) APPARATUS AND METHOD FOR RECEIVING A TOUCH INPUT

(75) Inventor: Dax Kukulj, Australian Capital Territory (AU)

(73) Assignee: ZETTA RESEARCH AND DEVELOPMENT LLC—RPO SERIES, Wilmington, DE (US)

( * ) Notice: Subject to any disclaimer, the term of this patent is extended or adjusted under 35 U.S.C. 154(b) by 649 days.

(21) Appl. No.: 13/510,155

(22) PCT Filed: Nov. 17, 2010

(86) PCT No.: PCT/AU2010/001540  
§ 371 (c)(1),  
(2), (4) Date: May 16, 2012

(87) PCT Pub. No.: WO2011/060487  
PCT Pub. Date: May 26, 2011

(65) Prior Publication Data  
US 2012/0223916 A1 Sep. 6, 2012

(30) Foreign Application Priority Data

Nov. 17, 2009 (AU) .................................. 2009905626  
Jun. 24, 2010 (AU) .................................. 2010902780

(51) Int. Cl.  
*G06F 3/042* (2006.01)  
*F21V 8/00* (2006.01)

(52) U.S. Cl.  
CPC ............ *G06F 3/0421* (2013.01); *G06F 3/0428* (2013.01); *G02B 6/0028* (2013.01)

(58) Field of Classification Search  
CPC ....................................................... G06F 3/044  
See application file for complete search history.

(56) References Cited

U.S. PATENT DOCUMENTS

| | | | |
|---|---|---|---|
| 8,339,379 B2* | 12/2012 | Goertz et al. ................ | 345/175 |
| 2008/0278460 A1 | 11/2008 | Arnett et al. | |
| 2008/0304084 A1* | 12/2008 | Kim et al. .................... | 356/614 |
| 2009/0167724 A1 | 7/2009 | Xuan et al. | |
| 2009/0219256 A1* | 9/2009 | Newton ....................... | 345/173 |
| 2012/0098794 A1* | 4/2012 | Kleinert et al. .............. | 345/175 |

FOREIGN PATENT DOCUMENTS

TW 200928917 A 7/2009

OTHER PUBLICATIONS

Chinese Office Action received in corresponding Chinese Application No. 201080061007.4 dated Feb. 2, 2015.

* cited by examiner

*Primary Examiner* — Kenneth B Lee, Jr.  
(74) *Attorney, Agent, or Firm* — Mattingly & Malur, PC

(57) ABSTRACT

Infrared-style touch screens are described having light emission means and light detection means along only two opposing sides of a touch input area, which are nevertheless able to detect and locate a touch object in two dimensions. Certain embodiments use an edge-blurring algorithm to determine the second coordinate, while other embodiments use a form of stereo-scopic vision to determine both coordinates by triangulation. These touch screens have minimal bezel width along two opposing sides of the touch input area, and also offer cost reductions associated with components and product assembly and manufacturing.

6 Claims, 22 Drawing Sheets

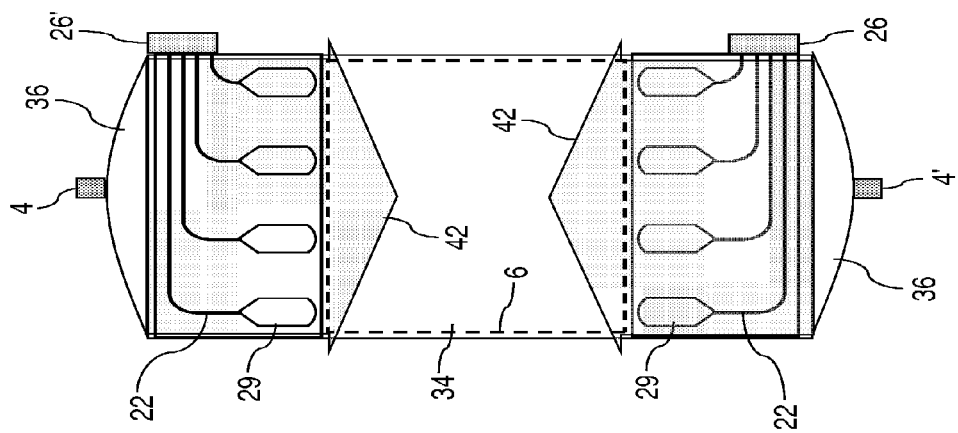
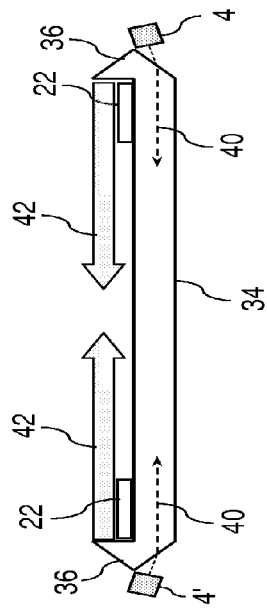
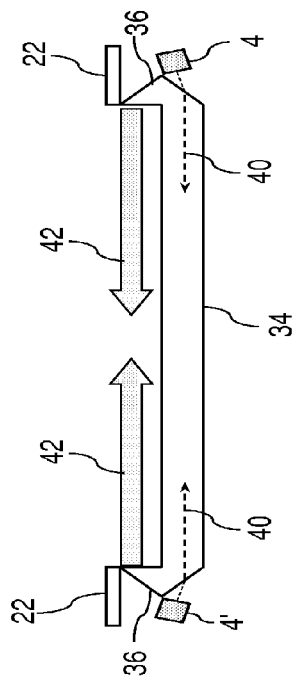
Fig 13A
Fig 13B
Fig 14

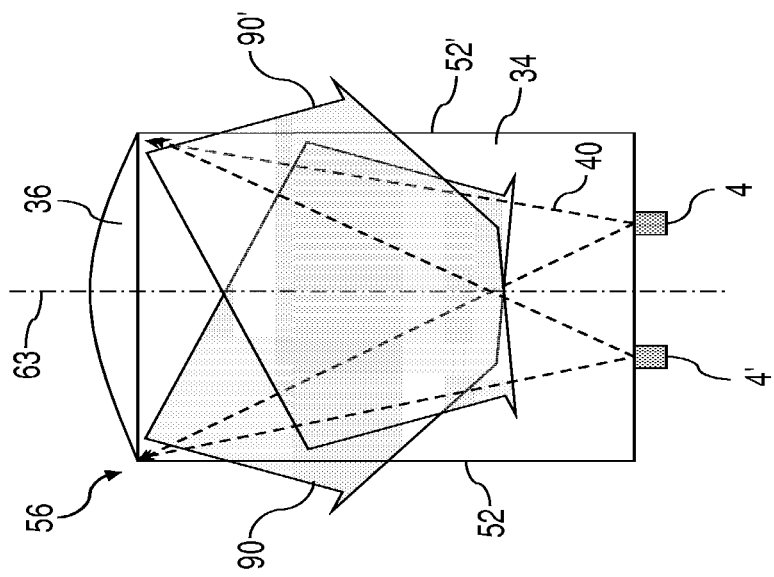
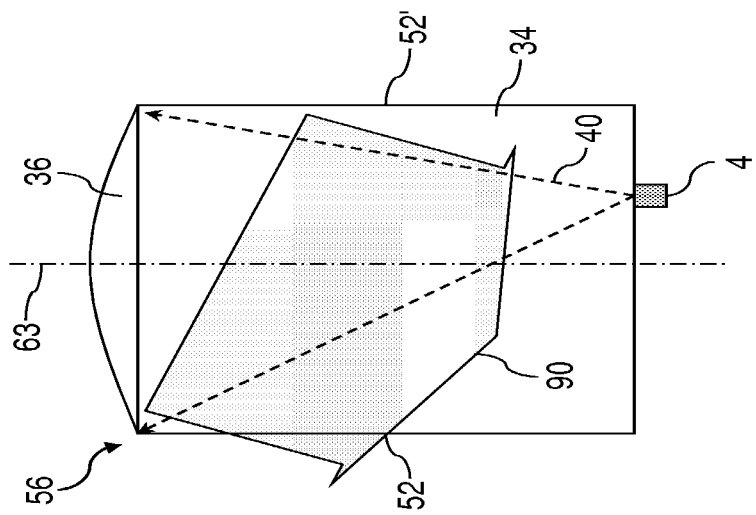

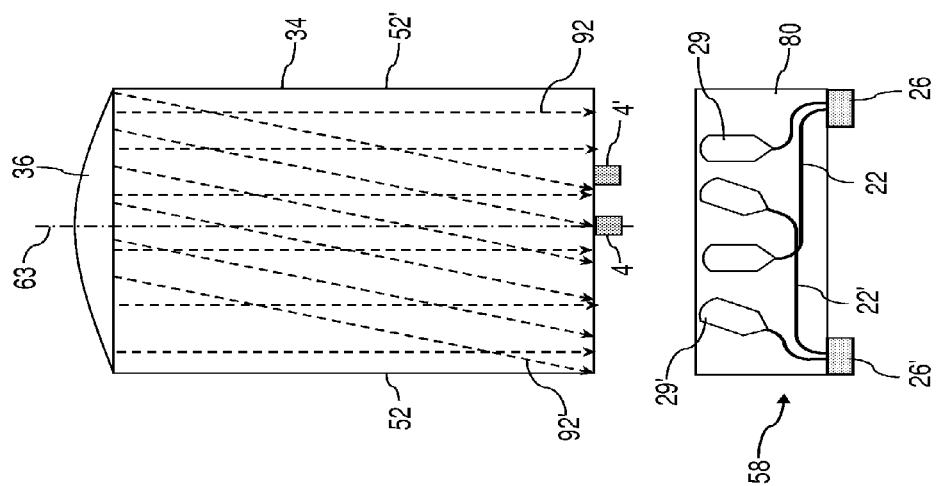
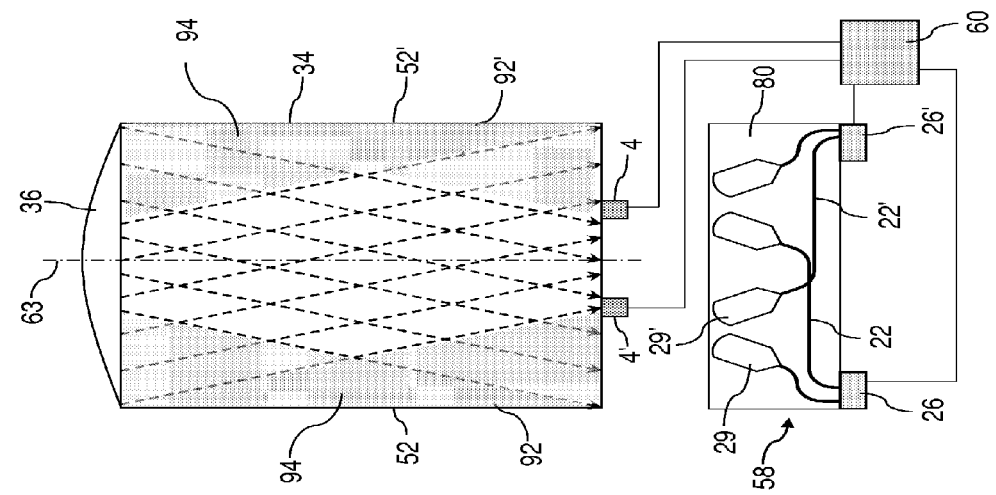
Fig 16A
Fig 16B

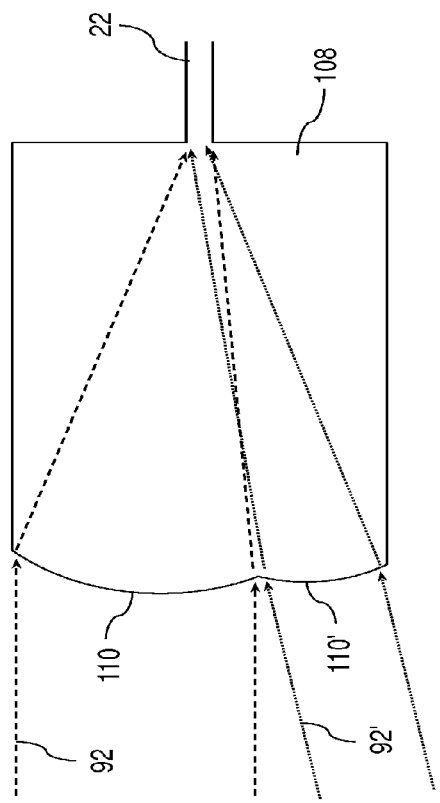
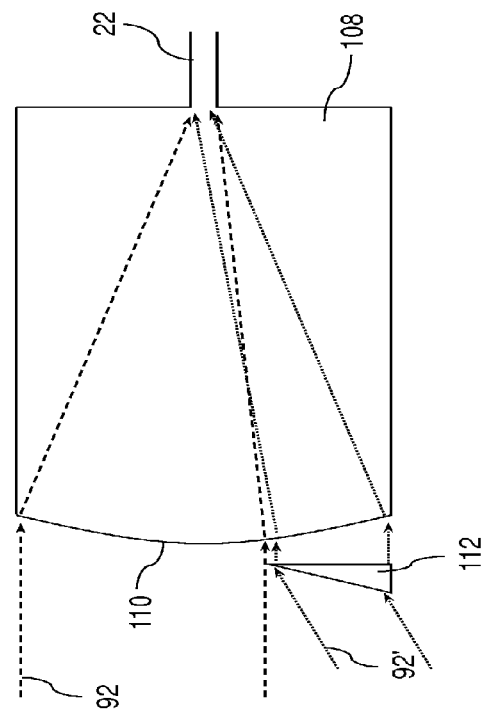

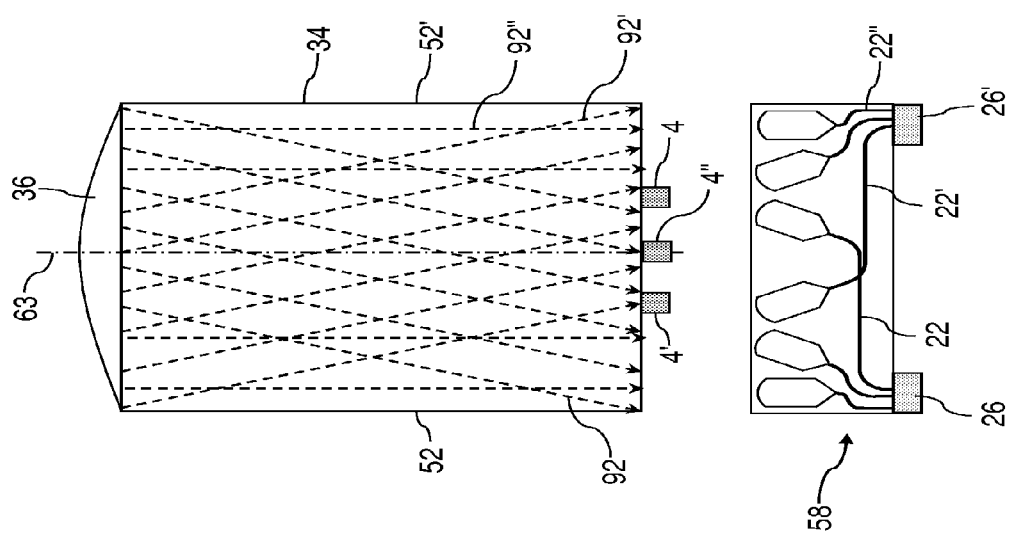

APPARATUS AND METHOD FOR RECEIVING A TOUCH INPUT

RELATED APPLICATIONS

The present application claims priority from Australian provisional patent application Nos. 2009905626 and 2010902780, and from U.S. provisional patent application No. 61/347,330, the contents of which are incorporated herein by reference.

FIELD OF THE INVENTION

The present invention relates to touch screens, and in particular to infrared-style touch screens having relatively fewer components, reduced bezel dimensions and/or lower cost. However, it will be appreciated that the invention is not limited to this particular field of use.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Input devices based on touch sensing (referred to herein as touch screens irrespective of whether the input area corresponds with a display screen) have long been used in electronic devices such as computers, personal digital assistants (PDAs), handheld games and point of sale kiosks, and are now appearing in other portable consumer electronics devices such as mobile phones. Generally, touch-enabled devices allow a user to interact with the device by touching one or more graphical elements, such as icons or keys of a virtual keyboard, presented on a display, or by writing on a display or pad. Several touch-sensing technologies are known, including resistive, surface capacitive, projected capacitive, surface acoustic wave, optical and infrared, all of which have advantages and disadvantages in areas such as cost, reliability, ease of viewing in bright light, ability to sense different types of touch object, e.g. finger, gloved finger or stylus, and single or multi-touch capability. The most common approach uses a flexible resistive overlay, although the overlay is easily damaged, can cause glare problems, and tends to dim the underlying screen, requiring excess power usage to compensate for such dimming. Resistive devices can also be sensitive to humidity, and the cost of the resistive overlay scales quadratically with perimeter. Another approach is the capacitive touch screen, which also requires an overlay. In this case the overlay is generally more durable, but the glare and dimming problems remain.

In yet another common approach, usually known as 'infrared' touch, a matrix of light beams (usually but not necessarily in the infrared) is established in front of a display, with a touch detected by the interruption of one or more of the beams. As shown in FIG. 1 the earliest forms of infrared-style touch screens 2, described for example in U.S. Pat. Nos. 3,478,220 and 3,673,327, included arrays of discrete optical sources 4 (e.g. LEDs) along two adjacent sides of a rectangular input area 6 emitting two sets of parallel beams of light 8 towards opposing arrays of photo-detectors 10 along the other two sides of the input area. If a touch object 12 in the input area blocks a substantial portion of at least one beam in each of the two axes, its location can be readily determined.

In a variant infrared-style touch screen 14 that greatly reduces the optoelectronic component count (and hence component cost), illustrated in FIG. 2 and described in U.S. Pat. No. 5,914,709, the arrays of light sources are replaced by arrays of 'transmit' optical waveguides 16 integrated on an L-shaped substrate 18 that distribute light from a single optical source 4 via a 1×N splitter 20 to produce a grid of light beams 8, and the arrays of photo-detectors are replaced by arrays of 'receive' optical waveguides 22 integrated on another L-shaped substrate 24 that collect the light beams and conduct them to a detector array 26 (e.g. a line camera or a digital camera chip). Each transmit optical waveguide includes an in-plane lens 28, and likewise each receive optical waveguide includes an in-plane lens 29, to collimate or focus the signal light in the plane of the input area 6, and the touch screen may also include cylindrically curved vertical collimating lenses (VCLs) 30 to collimate the signal light in the out-of-plane direction. As in the touch screen 2 of FIG. 1, a touch object is located from the beams blocked in each axis. For simplicity, FIG. 2 only shows four waveguides per side of the input area 6; in actual touch screens the in-plane lenses will be sufficiently closely spaced such that the smallest likely touch object will block a substantial portion of at least one beam in each axis.

In yet another variant infrared-style touch screen 31 shown in FIG. 3 and disclosed in US 2008/0278460 A1 entitled 'A transmissive body' and incorporated herein by reference, the 'transmit' waveguides 16 and associated in-plane lenses 28 of the FIG. 2 touch screen are replaced by a transmissive body 32 including a light guide plate 34 and two collimation/redirection elements 36 that include parabolic reflectors 38. Infrared light 40 from a pair of optical sources 4, e.g. LEDs, is launched into the light guide plate, then collimated and re-directed by the collimation/redirection elements to produce two sheets of light 42 that propagate in front of the light guide plate towards the receive waveguides 22. A touch event is detected and its location and dimensions determined from those portions of the light sheets blocked by the touch object. Clearly the light guide plate 34 needs to be transparent to the infrared light 40 emitted by the optical sources 4, and it also needs to be transparent to visible light if there is an underlying display (not shown). Alternatively, a display may be located between the light guide plate and the light sheets, in which case the light guide plate need not be transparent to visible light.

The use of waveguides on the receive side of the touch screens shown in FIGS. 2 and 3 also offers enhanced spatial resolution compared to the 'discrete component' touch screen shown in FIG. 1. To explain, only light rays propagating within a narrow range of angles will be focused by each in-plane lens 29 into its associated waveguide, with other light rays rejected.

A common aspect of the infrared-style touch screens shown in FIGS. 1, 2 and 3 is the presence of components around all four sides of the input area 6, which commonly coincides with a display. Whether these components be the arrays of optical sources 4 and photo-detectors 10 in the FIG. 1 device, or the waveguide substrates 18, 24 in the FIG. 2 device, or the waveguide substrate 24 and parabolic reflectors 38 in the FIG. 3 device, their presence limits how narrow the bezels can made. It will be appreciated that the associated 'bezel width' on all four sides limits the available display size within a given consumer electronics device, which may be a significant limitation for small devices such as mobile phones. Excessive bezel width can also be a problem for incorporating the additional functionality of infrared touch within an existing device design. Furthermore it will be appreciated that there is a component-related cost associated with having components on all sides of the display as well as extra assembly and manufacturing costs.

OBJECT OF THE INVENTION

It is an object of the present invention to overcome or ameliorate at least one of the disadvantages of the prior art, or to provide a useful alternative. It is an object of the invention in its preferred form to provide infrared-style touch screens with reduced bezel width on at least two sides of the input area. It is another object of the invention in its preferred form to provide infrared-style touch screens with fewer components, to reduce the cost in both the bill of materials and product assembly and manufacturing.

SUMMARY OF THE INVENTION

According to a first aspect, the present invention provides an input device comprising:
  an input area adapted to receive touch input to said input device;
  an emitting system adapted to emit a plurality of energy beams from a first side of said input area;
  a detector system disposed along a second side of said input area and adapted to measure the intensity distribution of said plurality of energy beams after said beams have traversed said input area, said second side opposing said first side; and
  an analyser operatively connected to said detector system and adapted to analyse said intensity distribution and to determine the position of said object along a coordinate axis between said first and second sides.

Preferably the plurality of energy beams is a substantially collimated signal in a substantially planar form. Preferably the energy beams comprise infrared or visible light. Preferably the analyser is further adapted to analyse said intensity distribution to determine the position of said object along a second coordinate axis which is at right angles to said coordinate axis between said first and second sides.

Preferably the sides of the input area adjacent said first side (or the second side) are free from an emitting system or a detector system. In this embodiment the input device consists of, or consists essentially of, the mutually opposed emitting and detector systems on the first and second sides and the remaining sides (third and fourth sides) are essentially free from any emission/detection systems, thereby to minimise the bezel widths on the third and fourth sides. It will be appreciated that the third and fourth sides are free from any transmit or receive arrays.

According to a second aspect the present invention provides a method for determining the position of an object within an input area, said method comprising the steps of:
  emitting a plurality of energy beams from a first side of said input area to a second opposed side of said input area;
  measuring the intensity distribution of said plurality of energy beams after said beams have traversed said input area; and
  analysing said intensity distribution to determine the position of said object along a coordinate axis between said first and second sides.

Preferably the input device consists essentially of the mutually opposed emitting and detector systems on the first and second sides and the remaining sides (third and fourth sides) are essentially free from any emission/detection systems, thereby to minimise the bezel widths on the third and fourth sides.

According to a third aspect the present invention provides an input device comprising:
  an input area adapted to receive touch input to said input device;
  an emitting system adapted to emit a plurality of energy beams from a first side of said input area;
  a detector system disposed along a second side of said input area and adapted to measure the intensity distribution of said plurality of energy beams after said beams have traversed said input area, said second side opposing said first side; and
  an analyser operatively connected to said detector system and adapted to analyse said intensity distribution, wherein the presence of an object within said input area produces a variation in said intensity distribution, said analyser being adapted to determine the position of said object along a coordinate axis between said first and second sides by analysing said variation.

Preferably the variation comprises a region of decreased intensity in said intensity distribution. The analyser is preferably adapted to determine a gradient at one or more locations within said region of decreased intensity to thereby determine the distance between the object and the second side of said input area. In preferred forms the magnitude of the gradient decreases with increasing distance between the object and the second side of the input area.

In one embodiment, the emitting system comprises: an optical source; a transmissive element adapted to receive, confine and transmit an optical signal in planar form; a collimation element adapted to substantially collimate an optical signal; and a redirection element adapted to redirect an optical signal, wherein said transmissive, collimation and redirection elements are arranged to receive an optical signal from said optical source and transmit, collimate and redirect said optical signal to produce said plurality of energy beams as a substantially collimated signal in a substantially planar form.

In another embodiment, the emitting system comprises: an optical source; and an array of transmit optical waveguides disposed along said first side of said input area and adapted to guide light from said optical source to said first side to produce said plurality of energy beams.

Preferably the detector system comprises an array of optical waveguides disposed along said second side and adapted to receive portions of said plurality of energy beams and conduct said portions to a detector array.

In preferred embodiments the analyser is further adapted to analyse the intensity distribution to determine the position of said object along a second coordinate axis which is at right angles to said coordinate axis between said first and second sides. Preferably the input device consists essentially of the mutually opposed emitting and detector systems on the first and second sides and the remaining sides (third and fourth sides) are essentially free from any emission/detection systems, thereby to minimise the bezel widths on the third and fourth sides.

According to a fourth aspect the present invention provides a method for determining the position of an object within an input area, said method comprising the steps of:
  projecting a plurality of energy beams from a first side of said input area to a second, opposing side of said input area;

measuring the intensity distribution of said plurality of energy beams after said beams have traversed said input area;

analysing said intensity distribution to determine a variation in said intensity distribution indicative of the presence of an object in said input area;

calculating a parameter of said variation in said intensity distribution; and utilising said parameter to determine the position of said object along a coordinate axis between said first and second sides.

It will be appreciated that for infrared touch the variation in said intensity distribution comprises a region of decreased intensity. Preferably, the parameter comprises a gradient measured at one or more locations within the region of decreased intensity. In preferred forms the magnitude of the gradient decreases with increasing distance between the object and the second side of the input area.

Preferably the plurality of energy beams is a substantially collimated signal in a substantially planar form.

In a further embodiment, the method further comprises the step of analysing said intensity distribution to determine the position of said object along a second coordinate axis which is at right angles to said coordinate axis between said first and second sides.

Preferably the input device consists essentially of the mutually opposed emitting and detector systems on the first and second sides and the remaining sides (third and fourth sides) are essentially free from any emission/detection systems, thereby to minimise the bezel widths on the third and fourth sides.

According to a fifth aspect the present invention provides an input device comprising:

an input area adapted to receive touch input to said input device;

an emitting system adapted to emit first and second pluralities of energy beams across said input area, said first and second pluralities of energy beams propagating in first and second directions between first and second sides of said input area, said first and second directions being angled relative to each other;

a detector system adapted to measure the intensity distributions of said first and second pluralities of energy beams after said beams have traversed said input area; and an analyser operatively connected to said detector system and adapted to analyse said intensity distributions, wherein the presence of an object within said input area produces variations in said intensity distributions, and said analyser is adapted to determine the position of said object along a coordinate axis between said first and second sides by analysing said variations.

Preferably the emitting system is adapted to emit said first and second pluralities of energy beams from said first side of said input area, and said detector system is disposed along said second side of said input area.

Preferably the detector system comprises: a first array of optical waveguides disposed along said second side and adapted to receive portions of said first plurality of energy beams and conduct said portions to a detector array; and a second array of optical waveguides disposed along said second side and adapted to receive portions of said second plurality of energy beams and conduct said portions to a detector array. Preferably, each optical waveguide terminates in an in-plane lens adapted to focus a portion of the respective plurality of energy beams into said waveguide.

In another embodiment, the detector system comprises: an array of optical waveguides and associated optical elements disposed along said second side, wherein each optical element is adapted to collect portions of said first and second pluralities of energy beams and focus said portions into its associated optical waveguide for guidance to a detector array.

In one example, each optical element comprises first and second focusing elements adapted to collect respective portions of said first and second pluralities of energy beams and focus said portions into the associated optical waveguide.

In another example, each optical element comprises a focusing element and a deflection element, wherein said focusing element and said deflection element in combination are adapted to collect a portion of said first plurality of energy beams and focus that portion into said associated optical waveguide, and said focusing element is adapted to collect a portion of said second plurality of energy beams and focus that portion into said associated optical waveguide.

Preferably the emitting system comprises first and second optical sources and a transmissive body, said transmissive body comprising:

a transmissive element adapted to receive, confine and transmit an optical signal in planar form; a collimation element adapted to substantially collimate an optical signal; and a redirection element adapted to redirect an optical signal, wherein:

said transmissive, collimation and redirection elements are arranged to receive an optical signal from an optical source and transmit, collimate and redirect said optical signal to produce a substantially collimated signal in a substantially planar form; and said first and second optical sources are positioned such that an optical signal from said first optical source is transmitted, collimated and redirected by said transmissive body to produce said first plurality of energy beams propagating in said first direction, and an optical signal from said second optical source is transmitted, collimated and redirected by said transmissive body to produce said second plurality of energy beams propagating in said second direction.

In another preferred embodiment, the emitting system comprises an optical source, an optical splitting element and a transmissive body, said transmissive body comprising:

a transmissive element adapted to receive, confine and transmit an optical signal in planar form; a collimation element adapted to substantially collimate an optical signal; and a redirection element adapted to redirect an optical signal, wherein:

said transmissive, collimation and redirection elements are arranged to receive an optical signal from an optical source and transmit, collimate and redirect said optical signal to produce a substantially collimated signal in a substantially planar form;

said optical source is positioned such that an optical signal from said optical source is transmitted, collimated and redirected by said transmissive body to produce a substantially collimated substantially planar signal; and said optical splitting element is positioned to split said substantially collimated substantially planar signal into said first and second pluralities of energy beams.

The optical splitting element preferably comprises a prism film or a phase mask. In yet another preferred embodiment, the emitting system comprises: an optical source, and first and second arrays of transmit optical waveguides disposed along said first side of said input area, wherein said first and second arrays of transmit optical waveguides conduct light from said optical source to said first side to produce said first and second pluralities of energy beams.

In still another preferred embodiment, the emitting system comprises: first and second optical sources, and first and second arrays of transmit optical waveguides disposed along said first side of said input area, wherein said first array of transmit optical waveguides conducts light from said first optical source to said first side to produce said first plurality of energy beams; and said second array of transmit optical waveguides conducts light from said second optical source to said first side to produce said second plurality of energy beams.

Preferably the angle between said first and second directions is in the range from 5° to 30°. More preferably the angle is approximately 10°.

Preferably the variations are analysed to determine the position of said object by triangulation. In preferred embodiments the analyser is further adapted to analyse the intensity distributions to determine the position of said object along a second coordinate axis which is at right angles to said coordinate axis between said first and second sides.

Preferably the input device consists essentially of the mutually opposed emitting and detector systems on the first and second sides and the remaining sides (third and fourth sides) are essentially free from any emission/detection systems, thereby to minimise the bezel widths on the third and fourth sides.

According to a sixth aspect the present invention provides a method for determining the position of an object within an input area, said method comprising the steps of:
- projecting first and second pluralities of energy beams across said input area in first and second directions to a second, opposing side of said input area, said first and second directions being angled relative to each other;
- measuring the intensity distributions of said first and second pluralities of energy beams after said beams have traversed said input area to determine variations in said intensity distributions indicative of the presence of an object in said input area; and
- analysing said variations to determine the position of said object along a coordinate axis between said first and second sides.

Preferably the input device consists essentially of the mutually opposed emitting and detector systems on the first and second sides and the remaining sides (third and fourth sides) are essentially free from any emission/detection systems, thereby to minimise the bezel widths on the third and fourth sides.

According to a seventh aspect the present invention provides an article of manufacture comprising a computer usable medium having a computer readable program code configured to conduct the method according to any one of the second, fourth or sixth aspects.

BRIEF DESCRIPTION OF THE DRAWINGS

Preferred embodiments of the invention will now be described, by way of example only, with reference to the accompanying drawings in which:

FIGS. 13A and 13B illustrate in plan view and side view a 'light guide plate' infrared touch screen according to an embodiment of the invention;

FIG. 14 illustrates in side view a 'light guide plate' infrared touch screen according to an embodiment of the invention;

FIG. 15A illustrates in plan view the effect of placing an optical source away from the focal axis of a parabolic reflector;

FIG. 15B illustrates in plan view an emitting system according to an embodiment of the invention, with two off-axis optical sources;

FIG. 16A illustrates in plan view a 'light guide plate' infrared touch screen incorporating the emitting system of FIG. 15B;

FIG. 16B illustrates in plan view a 'light guide plate' infrared touch screen incorporating the emitting system of FIG. 15C;

FIGS. 19A and 19B illustrate in plan view optical elements that are able to focus light beams propagating in two different directions into a single waveguide;

FIG. 21 illustrates in plan view a 'light guide plate' infrared touch screen according to an embodiment of the invention, with one on-axis optical source and two off-axis optical sources;

DETAILED DESCRIPTION OF PREFERRED EMBODIMENTS OF THE INVENTION

Figure 1:
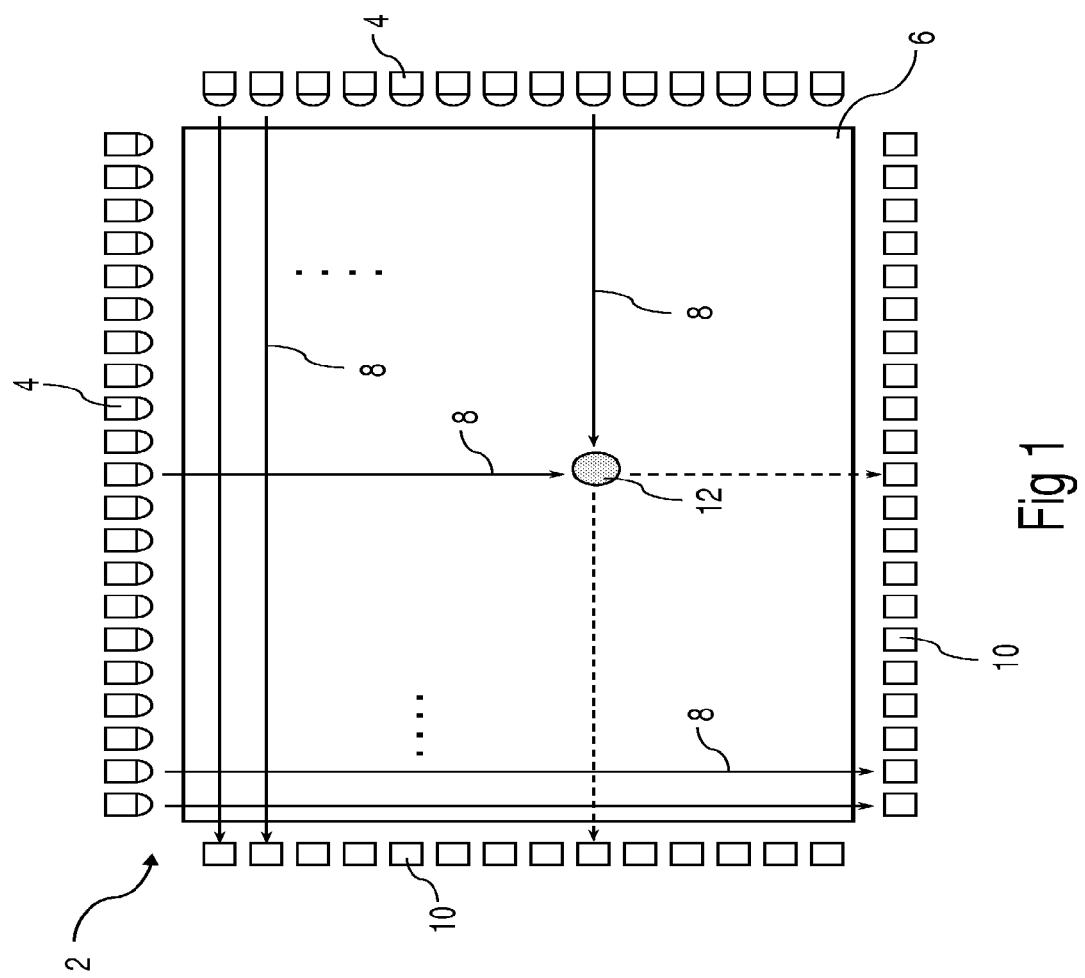
FIG. 1 illustrates a plan view of a 'discrete component' infrared touch screen with multiple paired optical sources and detectors.
Figure 2:
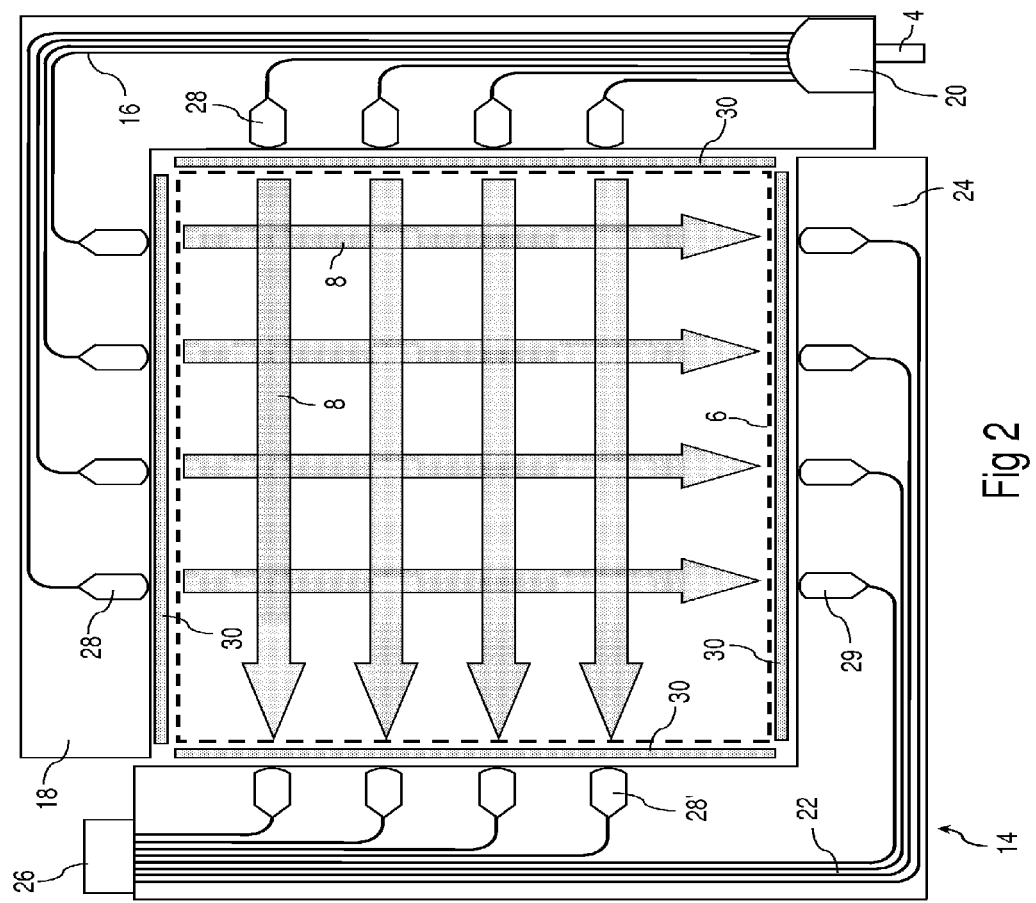
FIG. 2 illustrates a plan view of a waveguide-based infrared touch screen.
Figure 3:
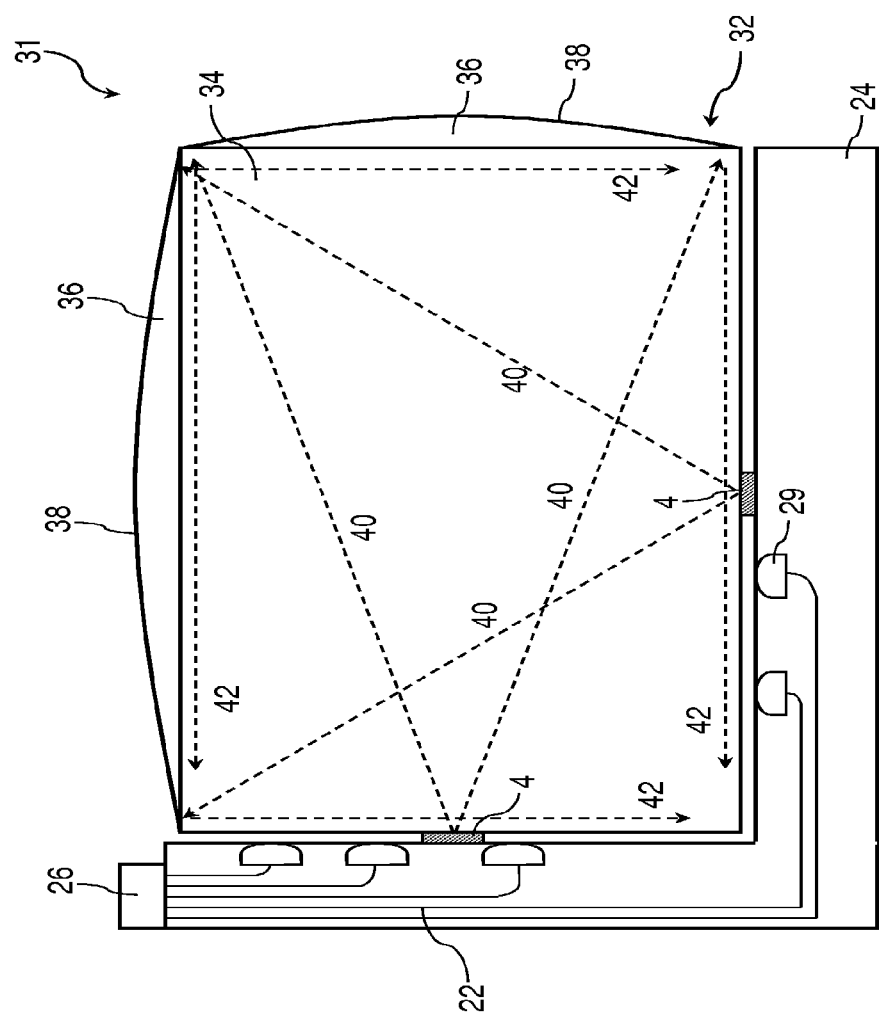
FIG. 3 illustrates a plan view of a 'light guide plate' infrared touch screen.
Figure 4:
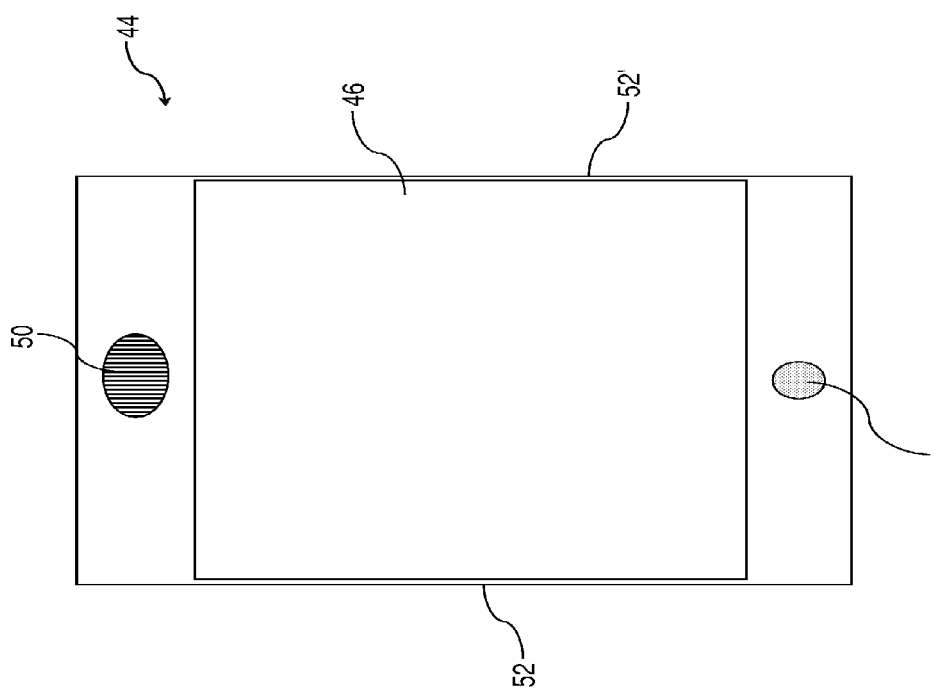
FIG. 4 illustrates in plan view a mobile phone with a touch screen extending across essentially its full width.

FIG. 4 shows in plan view a schematic of a mobile phone 44 equipped with a touch screen 46, an on/off switch 48 and a speaker 50. A particular feature of the touch screen shown here is that it has minimal bezel width on two opposing sides 52, 52', enabling it to occupy essentially the full width of the mobile phone, increasing the available screen area and possibly resulting in a more aesthetically pleasing appearance. The need for small bezel width along the other two sides is clearly less pressing. In this section some variations of the 'discrete component', 'waveguide-based' and 'light guide plate' styles of infrared touch screen (as shown in FIGS. 1, 2 and 3 respectively) are described that have the desired minimal bezel width on two opposing sides.

Figure 5B:
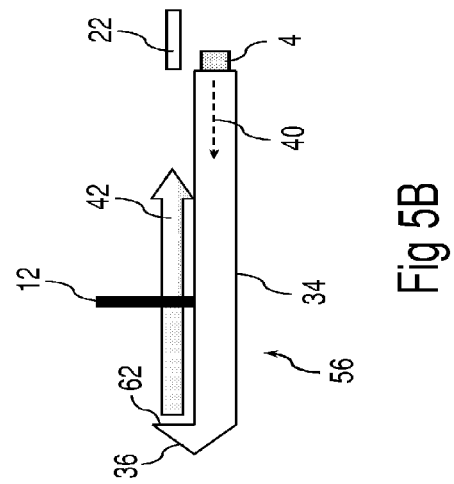
FIGS. 5A and 5B illustrate in plan view and side view a 'light guide plate' infrared touch screen according to an embodiment of the invention.
Figure 5A:
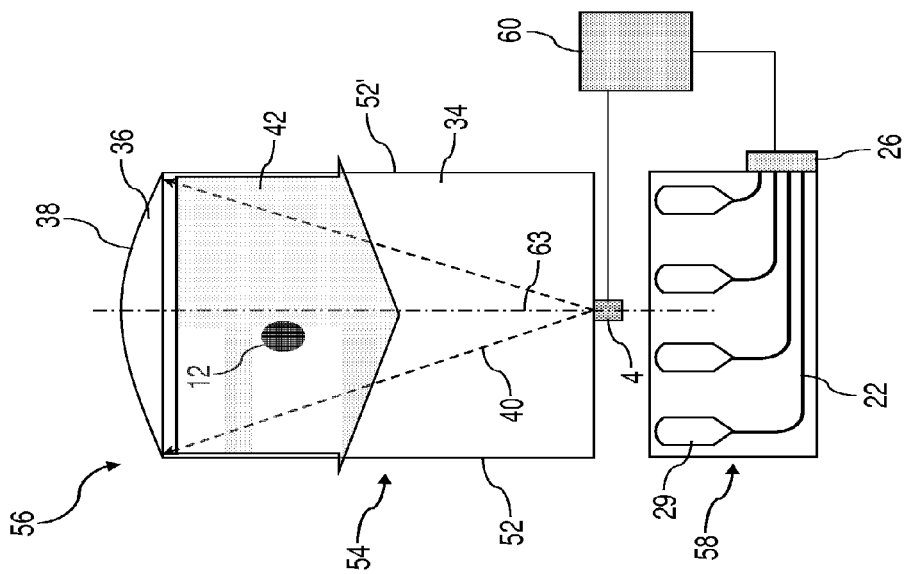

FIGS. 5A and 5B show plan and side views of a 'light guide plate' infrared touch screen 54 according to one embodiment of the present invention, comprising: an emitting system in the form of a 'single axis' transmissive body 56 comprising a light guide plate 34 and a single collimation/redirection element 36 including a parabolic reflector 38, and an LED 4 at the focal point of the parabolic reflector; a detector system 58 in the form of an array of 'receive' optical waveguides 22 and a line camera 26; and a controller 60 connected to the LED and the line camera. For simplicity a controller is generally not shown in subsequent illustrated embodiments, but will invariably be present. The light guide plate of the transmissive body is adapted to receive, confine and transmit in planar form an optical signal 40 from the LED, and the collimation/redirection element 36 is adapted to collimate the optical signal substantially and redirect it to produce a plurality of energy beams in the form of a substantially collimated sheet of light 42 emitted from the exit facet 62. The light sheet propagates in front of the light guide plate, and can be partially blocked by an object 12 on or close to the front surface of the light guide plate. The propagation direction is parallel to the focal axis 63 of the parabolic reflector, designed to be parallel to the lateral sides 52, 52' of the light guide plate so that the light sheet impinges on the array of in-plane lenses 29, and portions thereof focused into the receive waveguides.

In FIGS. 5A and 5B the transmissive body 56 is depicted as being a single piece, produced for example by injection moulding. However as explained in the abovementioned US 2008/0278460 A1 this is not essential, and in some circumstances it may be preferred to provide the transmissive body in two pieces (e.g. a light guide plate and a separate collimation/redirection element) or even in three pieces, and combine them during assembly. This also applies to all other 'light guide plate' infrared touch screens described in this specification. In addition the light guide plate can be located in front of the display (if present) or behind the display, or the display glass itself could be used to perform the function of the light guide plate.

Figure 6:
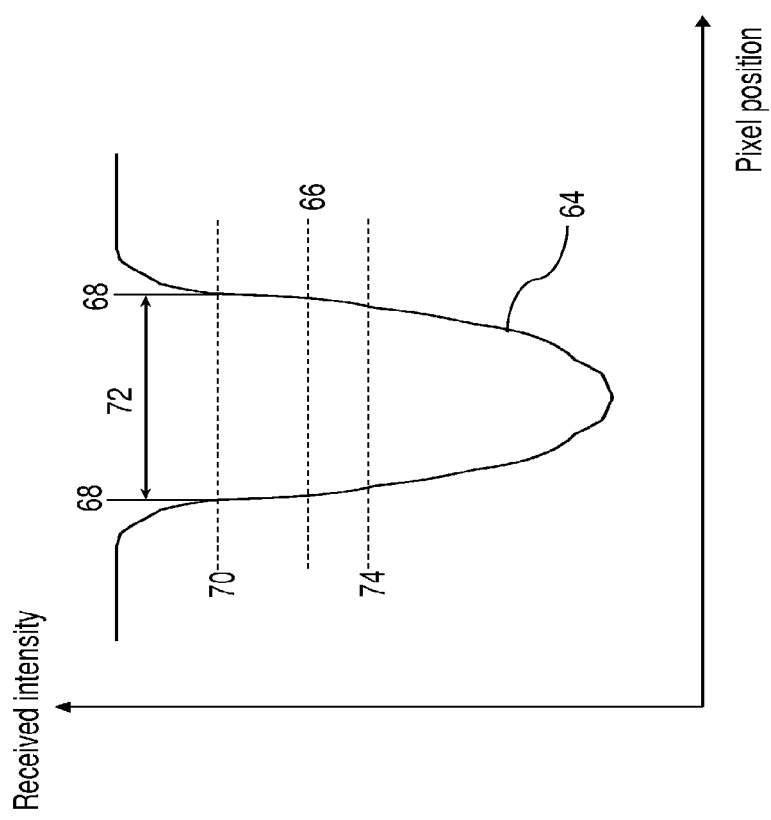
FIG. 6 illustrates schematically how the controller of a 'light guide plate' infrared touch screen detects a touch object.

The controller 60 of this touch screen 54 analyses the received intensity profile for variations that may indicate the presence of an object in the input area, and it will be clear that the X-axis coordinate of a touch object 12 can be readily determined from the portions of the light sheet blocked, in the same manner as the FIG. 3 device. Despite all expectations, it is also possible for the Y-axis coordinate to be determined. Before explaining how this can be achieved, we will describe in more detail how the controller determines the X-axis coordinate. FIG. 6 shows a plot of received intensity versus pixel position across a portion of a line camera, where the pixel position is related to position across the X-axis of the input area according to the layout of the receive waveguides. If a region of decreased intensity 64 falls below a 'detection threshold' 66, it is interpreted to be a touch event. The edges 68 of the touch object responsible are then determined with respect to a 'location threshold' 70 that may or may not coincide with the detection threshold, and the distance 72 between the edges provides a measure of the width, size or dimension of the touch object in the X-axis. Another important parameter is the slope of the intensity variation in the region of decreased intensity 64. There are a number of ways in which a slope parameter could be defined, and by way of example only we will define it to be the average of the gradients (magnitude only) of the intensity curve around the 'half maximum' level 74. Other examples will be known to the skilled person, such as by calculating turning or inflection points in the first and/or second differentials of the intensity distribution profile. In other embodiments a slope parameter may be defined differently, and may for example involve an average of the gradients at several points within the region of decreased intensity. We have found that 'light guide plate' touch screens are well suited to edge detection algorithms, providing smoothly varying intensity curves that enable precise determination of edge locations and gradients.

Figure 7:
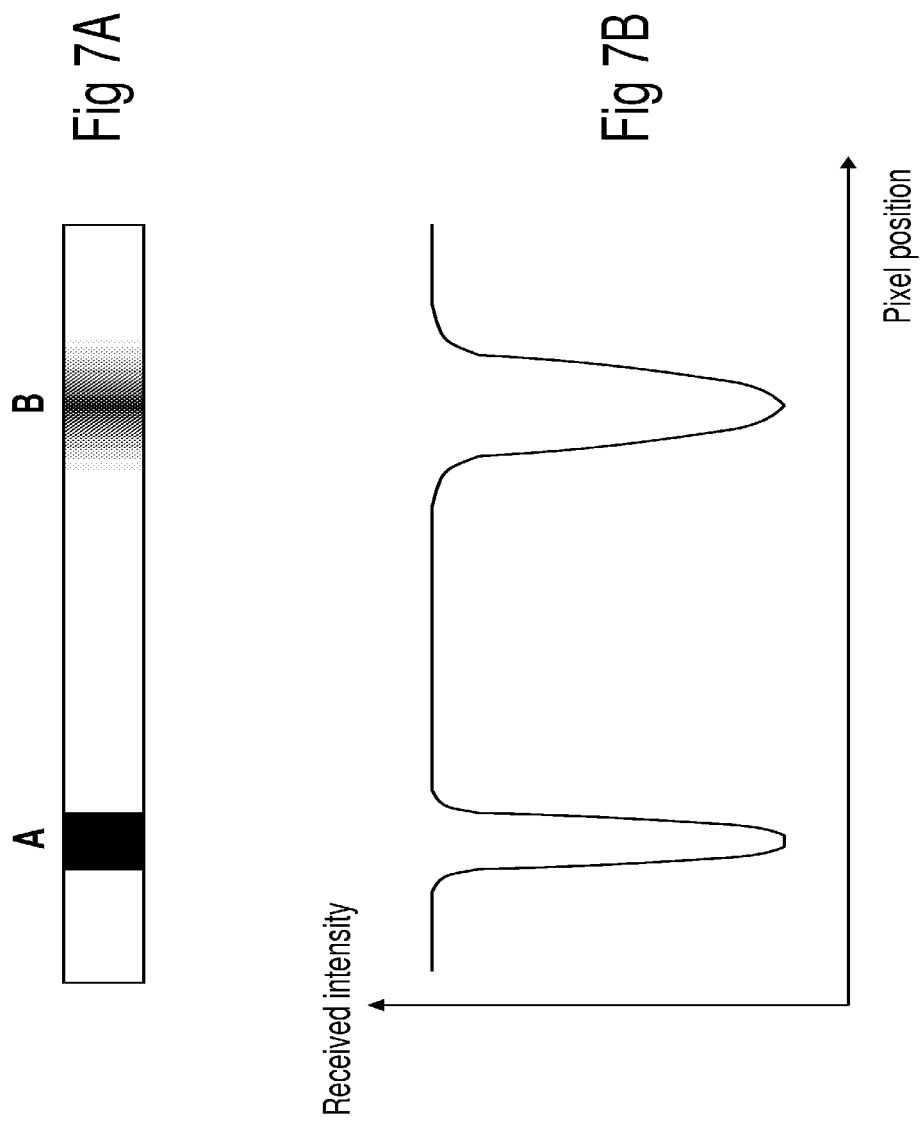
FIGS. 7A and 7B illustrate, for a 'light guide plate' infrared touch screen, the effect of distance from the receive waveguides on the sharpness of a shadow cast by a touch object.

To determine the Y-axis coordinate an 'edge diffraction effect' is used, whereby the sharpness of the edges of a touch event depends on the distance between the touch object and the receive waveguides. In particular, we have observed that in a 'light guide plate' infrared touch screen as shown in FIG. 3 the edges of a touch event become more blurred the further a touch object is from the receive waveguides. FIG. 7A schematically shows the shadows cast by two touch objects A and B as detected by a line camera, while FIG. 7B shows the corresponding plot of received intensity. Object A is closer to the receive waveguides and casts a sharper shadow, while object B is further from the receive waveguides and casts a more blurred shadow because of the edge diffraction effect. Mathematically, the sharpness of a shadow could be expressed in the form of a slope parameter as described above with reference to FIG. 6. The slope parameter, or some other quantification of shadow sharpness, therefore represents a measure of the distance of a touch object from the receive waveguides, i.e. its Y-axis coordinate. The controller then determines the actual Y-axis coordinate by comparing the slope parameter against a known calibration, such as a look-up table, that may be established during device testing at manufacture, or by a calibration routine that occurs at switch-on or as required by a user. In other embodiments the look-up table will be known from the touch screen configuration and simply incorporated into the controller as hardware or firmware, or in software running on the controller or a host device such as a mobile phone or computer. In yet other embodiments the slope parameter and the distance 72 between the touch object edges (i.e. the X-axis dimension of the touch object) may both be compared with one or more look-up tables to determine the Y-axis coordinate.

Without wishing to be bound by theory, we believe that this edge diffraction effect is due to the imperfect collimation of the in-plane receive waveguide lenses and/or the parabolic reflector, and may also be related to the fact that an LED is not an idealised point source. Furthermore the effect can be enhanced by designing the optical system to have a certain degree of imperfect collimation. Another way of interpreting the effect is the degree to which the object is measured by the system as being in focus. In FIG. 7A, touch object A is relatively in-focus, whereas touch object B is relatively out-of-focus and as such an algorithm can be used to determine the degree of focus and hence relative position. It will be appreciated by those skilled in the art that many such focusing algorithms are available and commonly used in digital still and video cameras.

Figure 8:
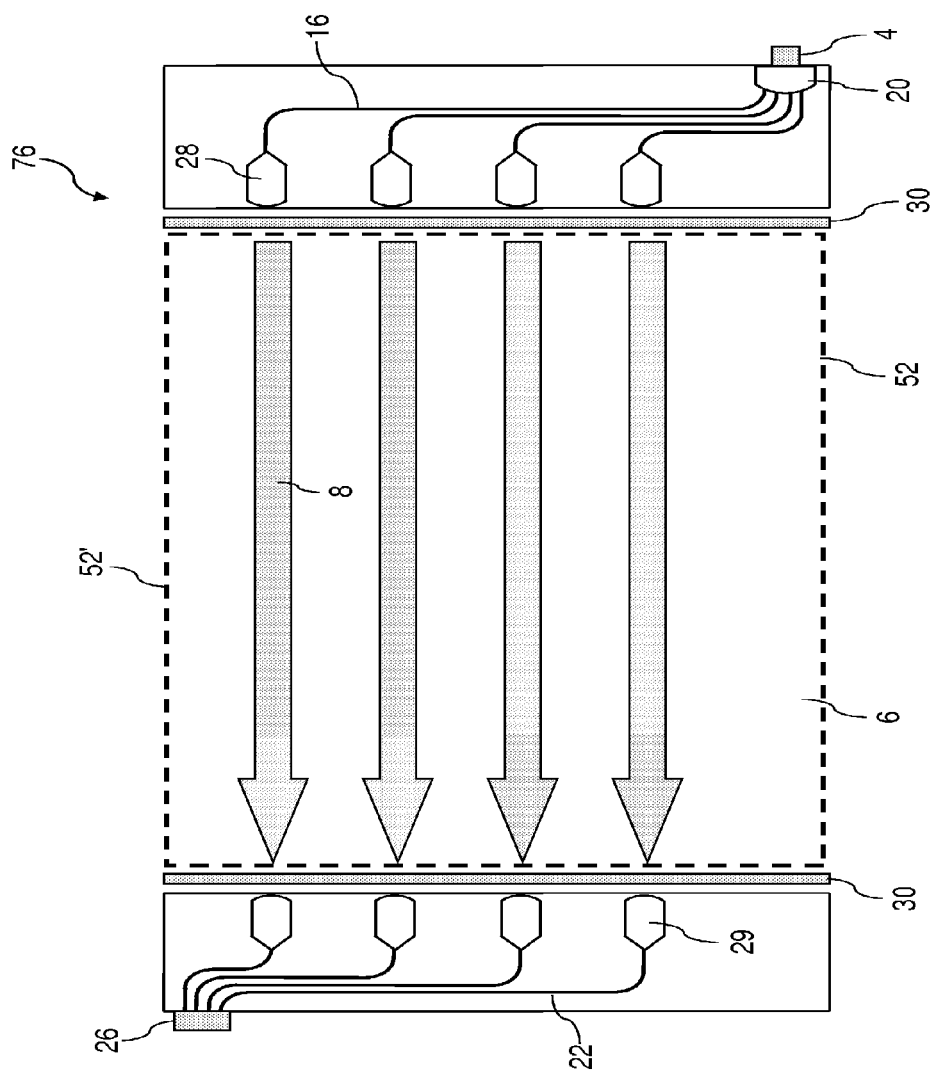
FIG. 8 illustrates in plan view a waveguide-based infrared touch screen according to an embodiment of the invention.
Figure 9:
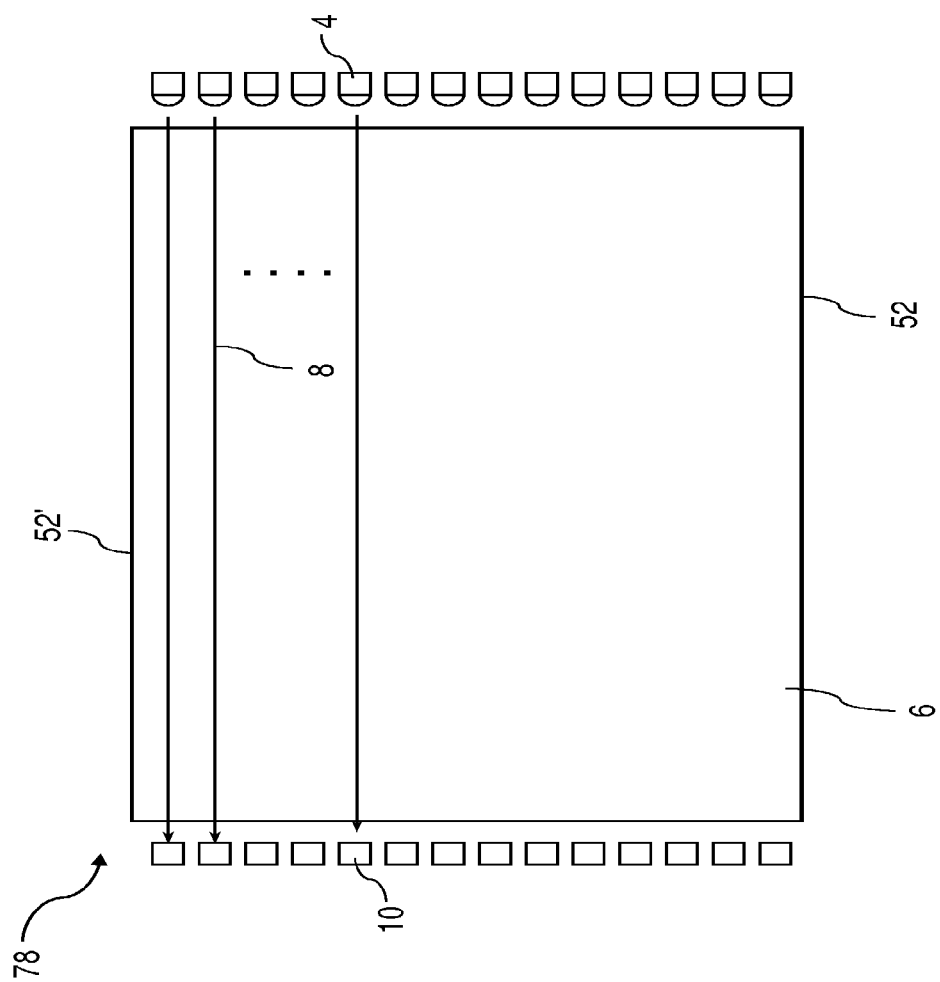
FIG. 9 illustrates in plan view a discrete component infrared touch screen according to an embodiment of the invention.

In further embodiments of the invention, the edge diffraction effect may be used to obtain a measure of the Y-axis coordinate in other types of infrared touch screen. For example FIG. 8 shows a plan view of a 'single axis' waveguide-based touch screen 76 where the energy beams 8 are produced by an array of transmit waveguides 16 as in the FIG. 2 device, and FIG. 9 shows a 'discrete component' infrared touch screen 78 with arrays of LEDs 4 and photo-detectors 10 along one pair of opposing sides only. In each case there will be a substantial reduction in bezel width along the screen sides 52, 52'.

It is not essential for the edge diffraction effect to take the form shown in FIGS. 7A and 7B, i.e. where the shadow cast by a touch object is sharper the closer the touch object is to the receive waveguides. It may be, depending on factors such as collimation/focusing at the receive side, that for other touch screen configurations and technologies the differential edge blurring is reversed such that objects further from the receive sides/detectors exhibit sharper edges. Nevertheless the same principles would apply, with a differential in edge sharpness being the key consideration for obtaining a measure of the Y-axis coordinate.

In yet other embodiments of the present invention, a 'single axis' infrared touch screen can have emitting systems and detector systems on both of the opposing sides, so that a touch object can be detected by two counter-propagating light fields. An advantage with such an arrangement is that the edge-blurring algorithm used to determine the Y-axis coordinate can be performed twice, to improve the accuracy. In favourable situations there may be no need for the controller to refer to a look-up table to determine the Y-axis coordinate; for example if the degree of edge blurring (as measured by a slope parameter for example) is equal in each of the two perspectives, the controller will conclude that the touch object is located at the midpoint of the screen in the Y-direction.

Figure 10:
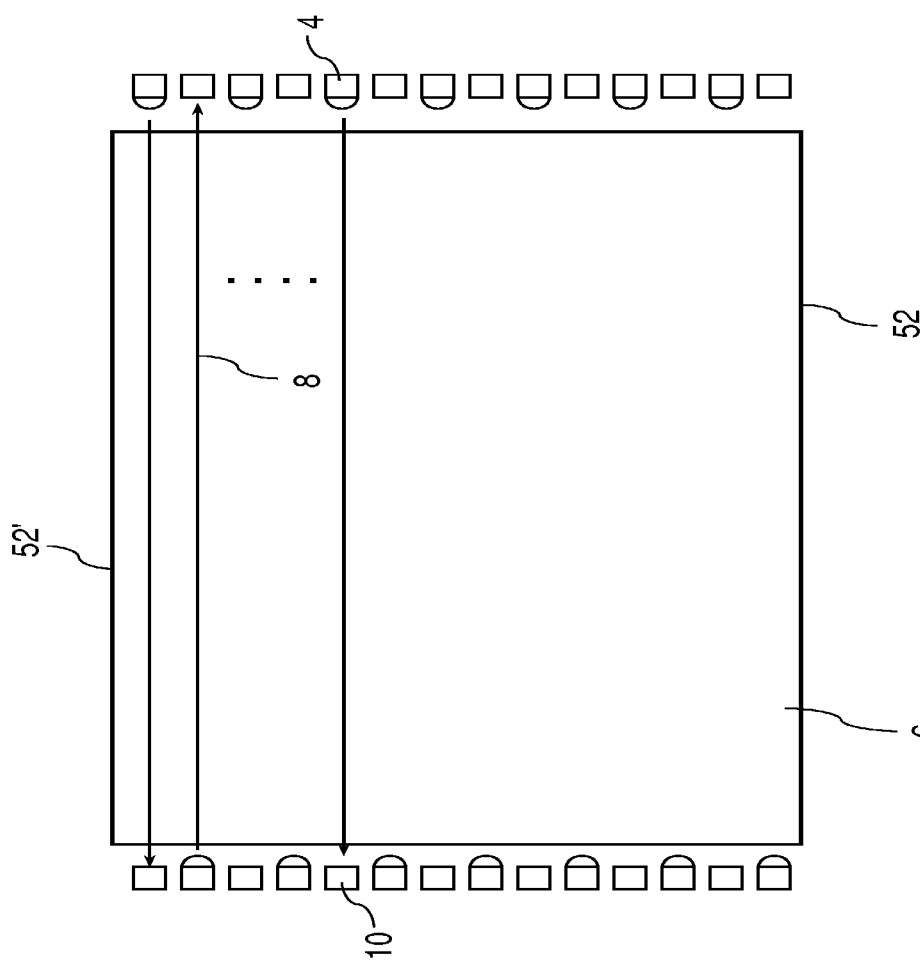
FIG. 10 illustrates in plan view a discrete component infrared touch screen according to an embodiment of the invention.
Figure 11:
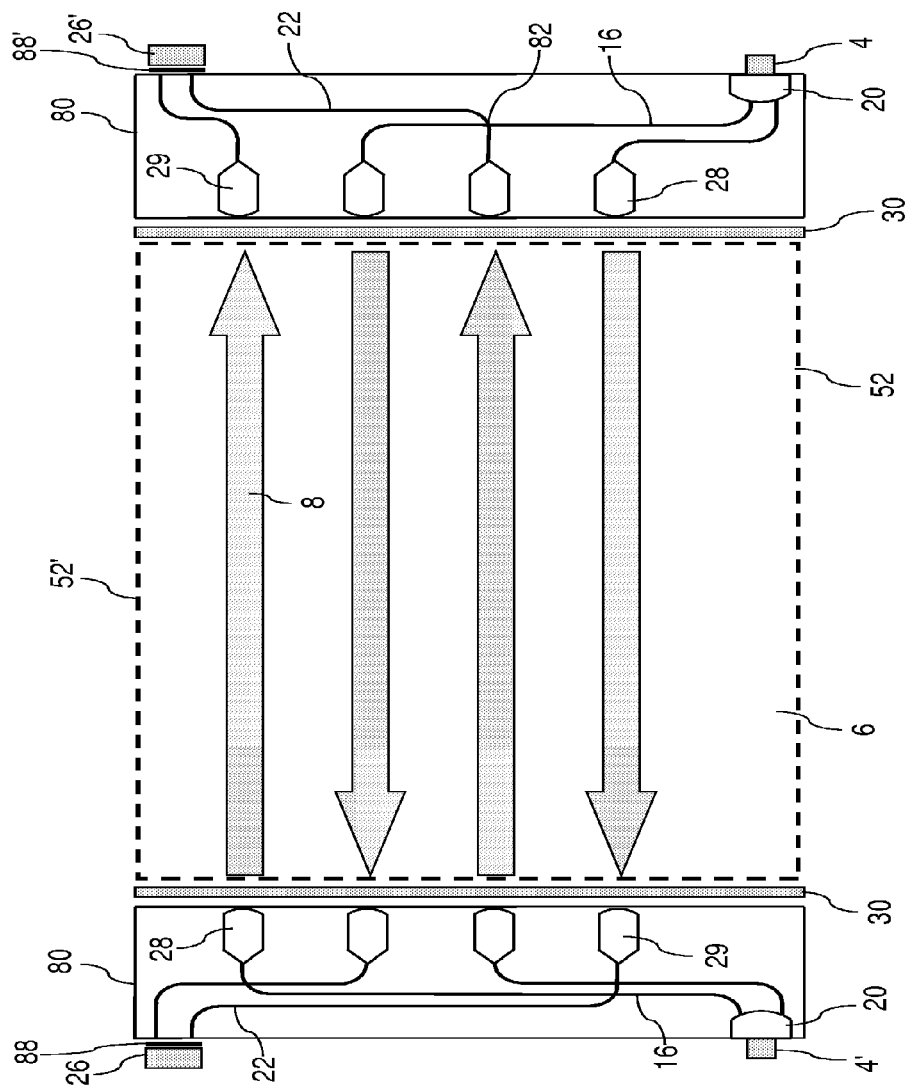
FIG. 11 illustrates in plan view a waveguide-based infrared touch screen according to an embodiment of the invention.

Counter-propagating light fields can be produced in straightforward fashion in a discrete component infrared touch screen by interleaving the LEDs 4 and photo-detectors 10 as shown in FIG. 10. FIG. 11 shows a suitable waveguide-based configuration with interleaved transmit and receive in-plane lenses 28, 29 and waveguides 16, 22 on a single substrate 80 along each of the two opposing sides. In general, waveguide crossings 82 are not a significant problem for waveguide fabrication or optical cross-talk, provided the crossing angle is sufficiently large (say greater than 10°) which can be ensured by an appropriate waveguide layout. However the spatial resolution may be reduced somewhat if the 'transmit' in-plane lenses 28 and the 'receive' in-plane lenses 29 are interleaved rather than being close packed. If desired, the transmit and receive waveguides can be fabricated on separate substrates that can be stacked waveguide-to-waveguide, waveguide-to-substrate or substrate-to-substrate as shown in side view in FIGS. 12A, 12B and 12C respectively. Lower cladding layers 84 and upper cladding layers 86 provide optical isolation for the core layers 16 and 22, as is usual for integrated optical waveguides. Optionally, the two LEDs 4, 4' in the FIG. 11 device have different emission wavelengths, and appropriate band pass or notch filters 88, 88' provided between the receive waveguides 22 and the line cameras 26, 26' to prevent any optical cross-talk between the counter-propagating light fields.

FIGS. 13A and 13B show plan and side views of one possible implementation of a 'light guide plate' touch screen with counter-propagating light fields, where the collimation/redirection elements 36 are set back somewhat from the input area 6 to make room for the arrays of receive waveguides 22. It should be noted that FIG. 13A in particular is not to scale; in actual touch screens the width of the receive waveguide arrays, including the in-plane lens length, will typically be 7 mm at most, much smaller than the dimensions of a typical mobile phone touch screen for example. This configuration includes a single light guide plate 34 having collimation/redirection elements 36 at both ends, and the LEDs 4, 4' launch light 40 into the light guide plate through the collimation/redirection elements. Alternatively there may be two stacked single axis light guide plates of the type shown in FIGS. 5A and 5B. FIG. 14 shows in side view another alternative configuration where the receive waveguide arrays 22 are mounted above the collimation/redirection elements 36, allowing the collimation/redirection elements to be located adjacent the input area, reducing the bezel width but increasing its height. Similar to the FIG. 11 device, the variant configurations shown in FIGS. 13A, 13B and 14 can also, if desired, include LEDs 4, 4' with different emission wavelengths, along with appropriate band pass or notch filters. These filters may be positioned between the receive waveguides 22 and the line cameras 26, 26', or between the in-plane lenses 29 and the input area 6.

We now turn to the description of another class of infrared touch screen configurations with optics along two opposing sides only, that can nevertheless determine a touch location in two dimensions, using a form of stereoscopic vision. Referring back to FIG. 5A, a single axis transmissive body 56 converts diverging light 40 from an LED 4 into a substantially collimated sheet of light 42 propagating parallel to the focal axis 63 of the parabolic reflector and parallel to the lateral sides 52, 52' of the light guide plate 34, provided the LED is positioned at the focal point of the parabolic reflector 38. If however an LED 4 is deliberately positioned 'off axis' as shown in FIG. 15A, the transmissive body 56 will produce a substantially collimated 'skew' light sheet 90 propagating at an angle to the focal axis 63.

Figure 15C:
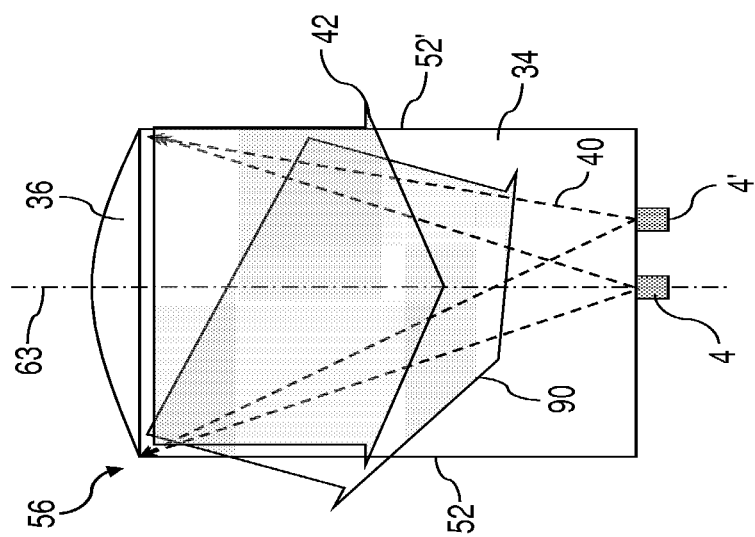
FIG. 15C illustrates in plan view an emitting system according to an embodiment of the invention, with one on-axis optical source and one off-axis optical source.

If two LEDs 4, 4' are placed on either side of the focal axis 63 as shown in FIG. 15B, the transmissive body 56 will produce two substantially collimated skew light sheets 90, 90', each propagating at an angle to the focal axis and to the lateral sides 52, 52'. Alternatively if one LED 4 is placed on the focal axis 63 and a second LED 4' is placed to one side of the focal axis as shown in FIG. 15C, the transmissive body 56 will produce one substantially collimated light sheet 42 propagating parallel to the focal axis and one substantially collimated skew light sheet 90.

Figure 12B:
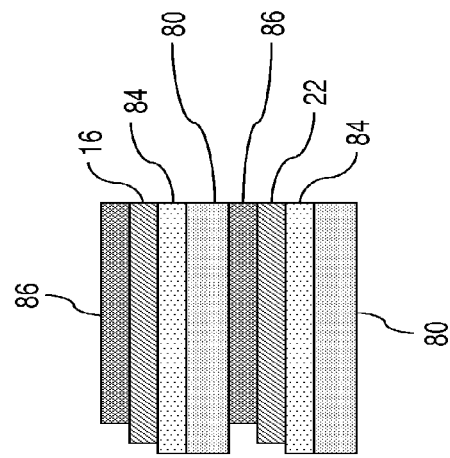
FIGS. 12A, 12B and 12C show in side view three possible arrangements for stacking arrays of integrated optical waveguides.
Figure 12C:
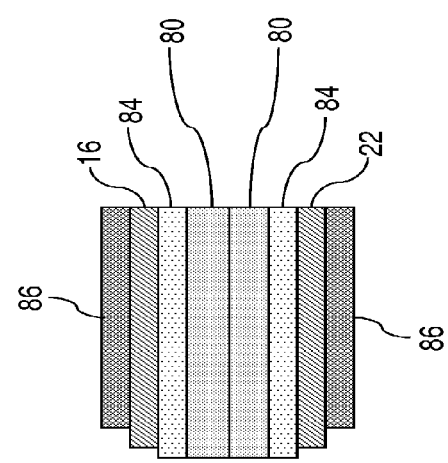
Figure 12A:
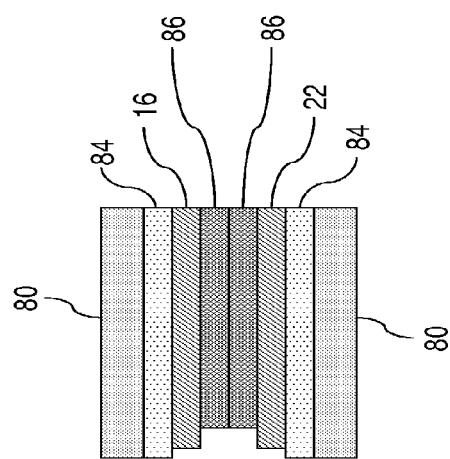

As illustrated in FIG. 16A, where the skew light sheets are shown as individual energy beam paths 92, 92', the addition of a detector system 58 in the form of two arrays of receive waveguides 22, 22' with in-plane lenses 29, 29' fabricated on a substrate 80 and adapted to receive portions of each light sheet and guide them to two line cameras 26, 26' (or alternatively to two sections of a single line camera), and a controller 60 connected to the LEDs and line cameras, yields a touch screen where the X and Y-coordinates of a touch object can be determined. A similar arrangement for the FIG. 15C emitting system is illustrated in FIG. 16B. The touch co-ordinates can be determined using a range of algorithms that will be known to one skilled in the art, for example triangulation. The receive waveguides can be provided in interleaved fashion on a single substrate as shown, or on two substrates stacked as shown in FIGS. 12A, 12B or 12C. As in previous embodiments with two optical sources, the two LEDs 4, 4' can optionally have different emission wavelengths, and appropriate band pass or notch filters provided between the receive waveguides and the line cameras, to prevent any optical cross-talk between the two skew light fields. However the excellent spatial filtering provided by the in-plane lenses 29, 29 will in most cases be sufficient to prevent this cross-talk. We note that the layouts of the receive waveguides 22, 22' on the substrate 80 illustrated in FIGS. 16A and 16B are exemplary only, and can be adjusted to relocate the line cameras 26, 26' if desired, for example if stray light from the LEDs 4, 4' is a problem.

Figure 17:
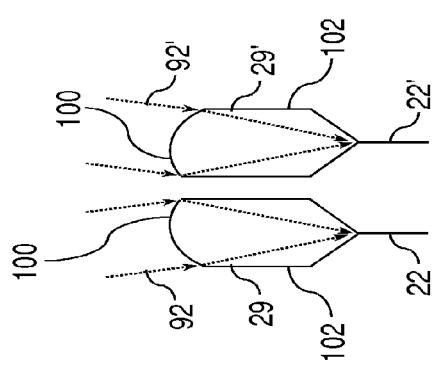
FIG. 17 illustrates in plan view designs for in-plane lenses suitable for receiving off-axis beams.

In certain embodiments the receive waveguides are adapted to receive energy beams propagating in a certain direction by having appropriately angled symmetrical in-plane lenses as shown in FIGS. 16A and 16B. In an alternative embodiment shown in FIG. 17 the receive waveguides have in-plane lenses 29, 29' with refractive surfaces 100 designed to capture energy beams 92, 92' propagating in certain directions. This alternative embodiment may be advantageous for close-packed waveguide layouts, since the sidewalls 102 of the in-plane lenses can be made parallel.

Figure 18:
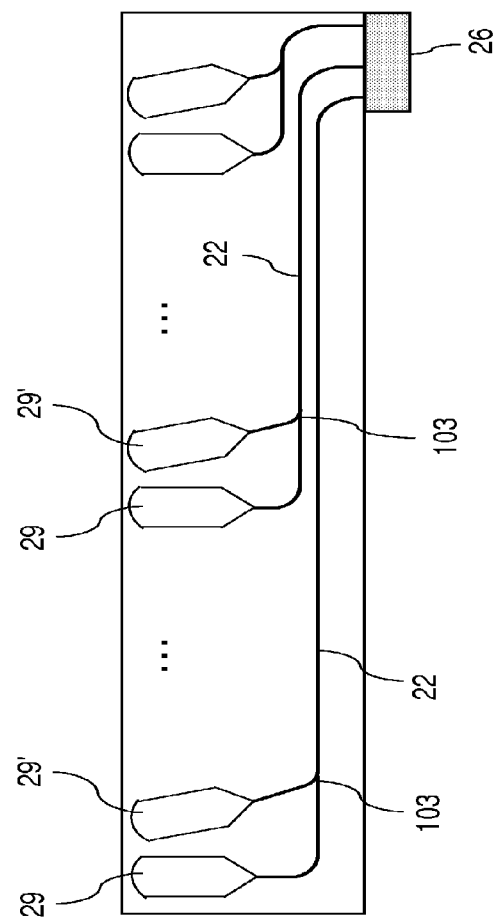
FIG. 18 illustrates in plan view a receive waveguide configuration where adjacent pairs of in-plane lenses feed into a common waveguide.

If the waveguide portion of the detector system is fabricated on a single substrate as shown in FIGS. 16A and 16B, the number of waveguides in the fairway leading to the line camera can be halved, significantly reducing the required substrate width, by having pairs of in-plane lenses 29, 29' feed into a single receive waveguide 22 at a series of Y junctions 103 as shown in FIG. 18. In this configuration, the LEDs 4, 4' are pulsed sequentially in a time division multiplexed fashion to provide discrimination between the two sets of beam paths 92, 92'. However in a result well known to those skilled in the art of integrated optics, this configuration has the disadvantage of a 3 dB loss at every Y junction, where 50% of the light collected by the in-plane lenses is lost to radiation modes.

This 3 dB loss can be avoided by combining pairs of in-plane lenses into an optical element that can collect two sets of substantially collimated light beams propagating in different directions and focus them into a single waveguide. In certain embodiments this optical element comprises a separate focusing element for each set of substantially collimated light beams; for example as shown in FIG. 19A it may comprise a slab waveguide 108 with first and second focusing elements in the form of two curved refractive surfaces 110, 110' designed to focus light paths 92, 92' into a single waveguide 22. In other embodiments this optical element comprises a focusing element and a deflection element; for example as shown in FIG. 19B it may comprise a deflection element in the form of a prism 112 positioned in front of a focusing element in the form of a curved front surface 110 of a slab waveguide 108. One set of light paths 92 is focused by the curved surface into a waveguide 22, while the other set of light paths 92' is deflected by the prism such that the curved surface can focus it into the waveguide. Several variations are possible; for example the deflection element could be located after the focusing element by forming an air prism inside the slab waveguide.

Figure 20A:
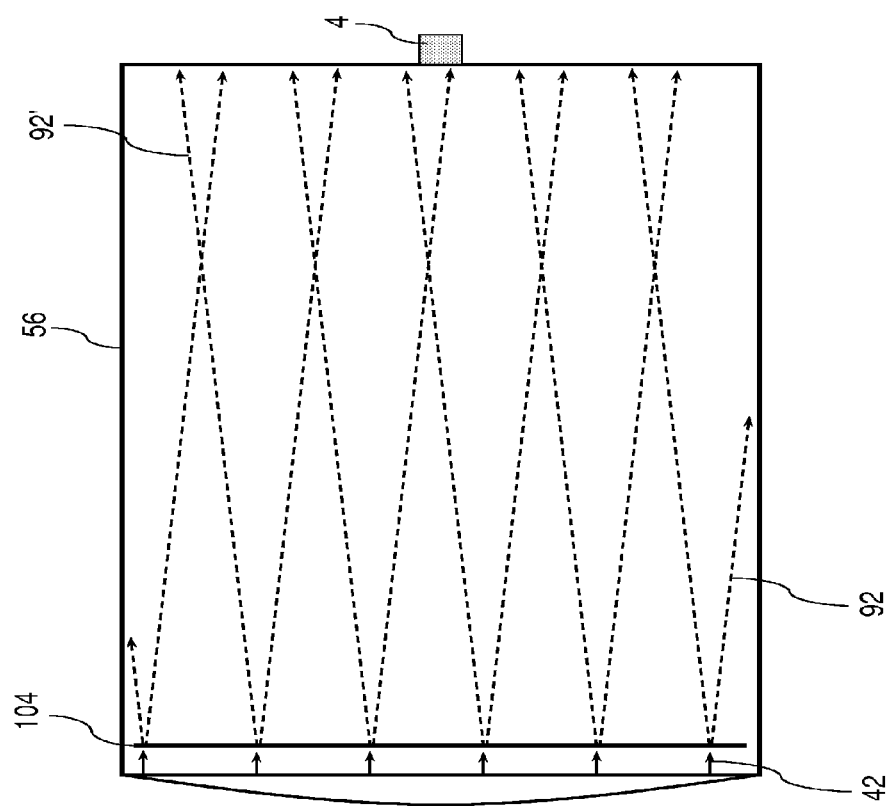
FIG. 20A illustrates in plan view an emitting system according to an embodiment of the invention, with an optical splitting element.
Figure 20B:
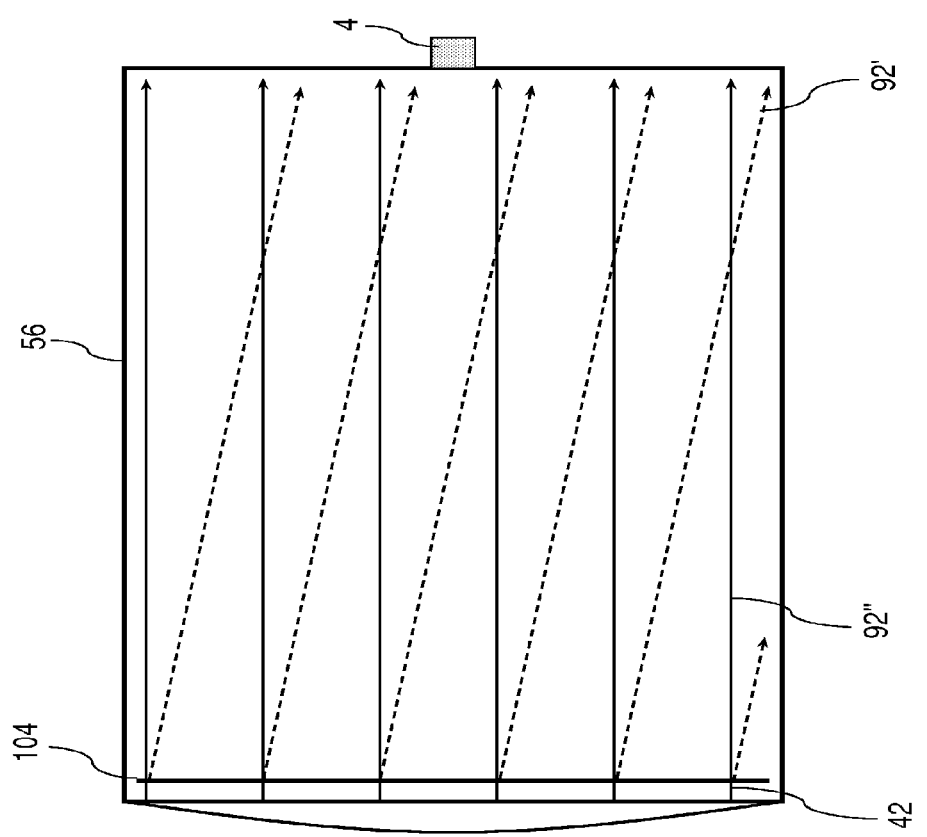
FIG. 20B illustrates in plan view an emitting system according to an embodiment of the invention, with an optical splitting element.

In alternative embodiments shown in FIG. 20A and 20B, the emitting system comprises an optical source 4, a transmissive body 56 and an optical splitting element 104, where the light sheet 42 emitted by the transmissive body is split by the optical splitting element to produce two pluralities of light paths propagating in different directions, for example two pluralities of skew beam paths 92, 92' as shown in FIG. 20A, or a plurality of skew beam paths 92 and a plurality of straight beam paths 92" as shown in FIG. 20B. As described in more detail in PCT patent application No. PCT/AU2010/001232 entitled 'Projection systems for touch input devices', the contents of which are incorporated by reference, the optical splitting element may for example be a prism film or a phase mask. In these embodiments with only one optical source, it is necessary for the detector system to keep the two pluralities of beam paths separate, for example by providing two sets of receive waveguides connected to separate line cameras or separate portions of a single line camera.

It can be seen from FIG. 16A that there are regions 94 close to the lateral sides 52, 52' with incomplete or no light beam coverage, where an object cannot be located precisely (single axis beam coverage only) or detected at all (no beam coverage). It will be appreciated that there will also be regions with incomplete beam coverage in the configuration shown in FIG. 16B. This problem can be lessened by reducing the angle that the skew light beams make with the Y-axis, or equivalently reducing the angle between the propagation directions of the two sets of light beams, which equates to placing one or both of the LEDs closer to the focal axis. However this also decreases the accuracy with which the Y-axis coordinate can be determined, so there will be a trade-off between screen coverage and accuracy. Preferably the crossing angle, i.e. the angle between the two propagation directions, is in the range 5° to 30°, more preferably about 10°. By way of example, for the specific case of a 3.5" input area with a 4:3 aspect ratio (71.1 mm×53.3 mm), a pair of skew light sheets oriented at ±5° to the long sides (Y-axis), i.e. a crossing angle of 10°, provides a resolution of 100 dpi in the X-axis and 10 dpi in the Y-axis, with a maximum dead zone of 6 mm on either side, which is adequate for finger touch. Alternatively, the touch input area can be oversized relative to the display area to ensure that the entire display area is covered by light beams.

In yet another configuration, illustrated in plan view in FIG. 21, the shaded regions 94 of FIG. 16A can be covered by providing an additional LED 4" at the focal point of the parabola to generate an additional set of beams 92", and an additional set of receive waveguides 22". These additional beams could also be generated through imperfect collimation of the parabolic reflector or by using LEDs 4 and 4' with an emitting area that is considerably wider than an idealised point source.

Instead of using two individual LEDs 4, 4' as in FIGS. 16A or 16B, or three individual LEDs 4, 4', 4" as in FIG. 21, a distributed form of light emission could be used. This would provide a whole range of beam paths at many different angles, without any apparent collimation, but the in-plane lenses 29 would still provide sufficient spatial filtering to form the detection grid and allow the determination of touch co-ordinates.

Figure 22:
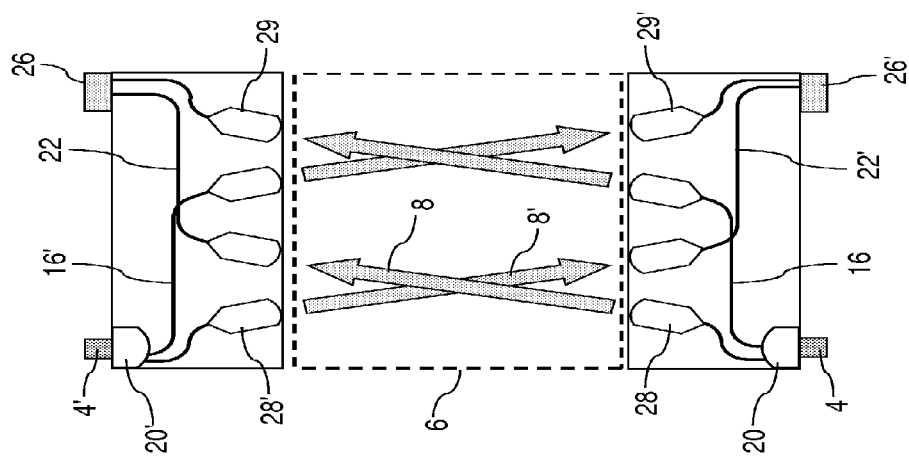
FIG. 22 illustrates in plan view a waveguide-based infrared optical touch screen according to an embodiment of the invention.

An all-waveguide infrared touch screen operating along similar principles is shown in plan view in FIG. 22. This device may have two optical sources 4, 4' (optionally with different emission wavelengths) as shown, or a single optical source, and a detector system comprising two sets of receive waveguides 22, 22' and two line cameras 26, 26' as shown, or some other suitable combination of waveguides, lenses and line cameras such as those described above with regard to FIGS. 16A to 19B. The transmit waveguides 16, 16' can be provided on a single substrate as shown or on two separate stacked substrates, and likewise for the receive waveguides 22, 22'. As in the devices shown in FIGS. 16A and 16B, the excellent spatial filtering provided by the receive side in-plane lenses 29 is useful in preventing cross-talk between the two parallel sets of light beams 8, 8'. It will be appreciated that a 'discrete component' version is also possible, if the individual photo-detectors are correctly angled and/or have sufficient spatial filtering to receive light from essentially one direction only. Alternatively, one can activate the optical sources and/or the photo-detectors sequentially to avoid cross-talk.

Figure 23:
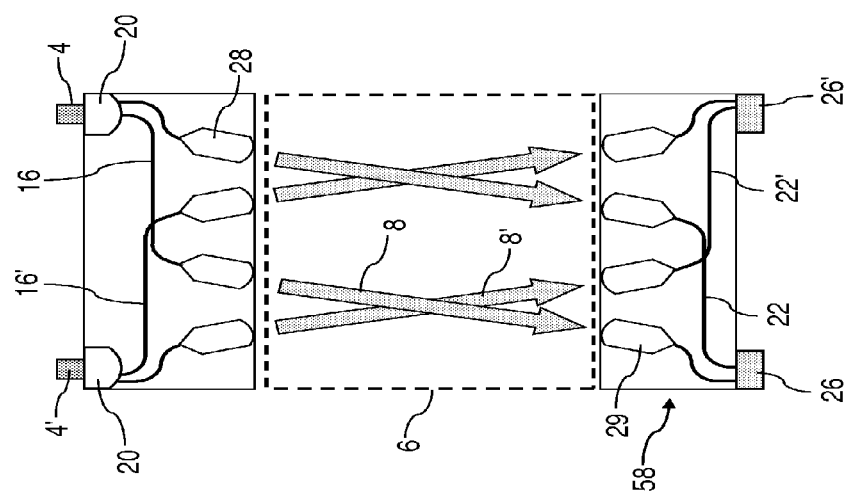
FIG. 23 illustrates in plan view a waveguide-based infrared optical touch screen according to an embodiment of the invention.

Although it is convenient for several reasons to provide the emitting system and the detector system on opposite sides of the input area, e.g. because it simplifies the device assembly and enables the use of combined focusing elements as shown in FIGS. 19A and 19B, and/or optical splitting elements as shown in FIGS. 20A and 20B, this is not essential. It is possible to provide portions of the emitting and detector systems on opposite sides of the input area, such that one set of light beams propagates from a first side to a second side and a second set of light beams propagates from the second side to the first side. For example FIG. 23 shows in plan view an all-waveguide infrared touch screen with two emitting sub-systems each comprising an LED 4/4', a 1×N splitter 20/20' and an array of waveguides 16/16' with associated in-plane lenses 28/28' on opposing sides of the input area 6, and two detector sub-systems each comprising a camera 26/26' and an array of waveguides 22/22' with associated in-plane lenses 29/29'. The two sets of light beams 8, 8' propagate at an angle to each other as required for the 'stereoscopic vision' embodiments. It will be appreciated that a corresponding 'light guide plate' configuration could also be constructed, similar to that shown in FIG. 13A but with the two light sheets propagating at different angles.

All waveguide layouts described above, including transmit or receive waveguides with in-plane lenses, focusing elements or deflection elements as required, can be fabricated from photocurable polymer materials using photo-patterning/wet development techniques described for example in U.S. Pat. No. 7,218,812 entitled 'Planar waveguide with patterned cladding and method for producing same'.

It will be appreciated that any of the aforementioned configurations can be combined to extend or improve their performance. For example the stereoscopic vision configurations could also incorporate the edge-blurring effect to provide enhanced resolution across the whole touch area or to provide enhanced resolution in the single beam coverage area.

It is noted that the collimating function provided by the parabolic reflectors used in any of the aforementioned configurations can also be achieved by a refracting lens element, which can be configured as a simple lens or a segmented or Fresnel lens to minimise size. Similarly, the simple parabolic reflectors could be replaced by segmented parabolic reflectors.

Although the invention has been described with reference to specific examples, it will be appreciated by those skilled in the art that the invention may be embodied in many other forms.

The invention claimed is:

1. An input device comprising:
an input area to receive touch input to said input device;
an emitting system to emit first and second pluralities of energy beams across said input area, said first and second pluralities of energy beams propagating in first and second directions between a first side and a second side of said input area, where said first and second directions are angled relative to each other, and said second side opposing said first side;
a detector system to measure intensity distributions of said first and second pluralities of energy beams after said beams have traversed said input area; and
an analyzer operatively connected to said detector system to analyze plural variations in said intensity distributions from an object within said input area, and determine a position of said object along a coordinate axis between said first side and said second side, where and said variations comprise plural regions of decreased intensity in said intensity distribution,
wherein said analyzer determines plural gradients at locations within said regions of decreased intensity and thereby determines a distance between said object and said detector corresponding to said position of said object along said coordinate axis,
wherein magnitudes of said gradients decrease when said distance between said object and said detector increases,
wherein said emitting system emits said first and second pluralities of energy beams from said first side of said input area, and said detector system is disposed along said second side of said input area,
wherein said detector system comprises:
a first array of optical waveguides disposed along said second side to receive portions of said first plurality of energy beams and conduct said portions to a detector array; and
a second array of optical waveguides disposed along said second side to receive portions of said second plurality of energy beams and conduct said portions to a detector array,
wherein each of the optical waveguides terminates in an in-plane lens to focus a portion of the respective plurality of energy beams,
wherein said emitting system comprises an optical source to produce an optical signal, an optical splitting element and a transmissive body,
wherein said transmissive body comprises:
a transmissive element to receive, confine and transmit said optical signal in planar form;
a collimation element to substantially collimate said optical signal; and
a redirection element to redirect said optical signal,
wherein said transmissive, collimation and redirection elements are arranged to receive said optical signal from said optical source and transmit, collimate and redirect said optical signal to produce a substantially collimated signal in a substantially planar form, and
said optical splitting element is positioned to split said substantially collimated substantially planar signal into said first and second pluralities of energy beams, and said optical splitting element comprises a prism film or a phase mask.

2. An input device according to claim 1, wherein each of the optical waveguides is respectively associated with an optical element that comprises a focusing element and a deflection element,
wherein said focusing element and said deflection element in combination collect and focus a portion of said first plurality of energy beams into said associated optical waveguide, and said focusing element collects and focuses a portion of said second plurality of energy beams into said associated optical waveguide.

3. An input device according to claim 1, wherein the angle between said first and second directions is in a range from 5° to 30°.

4. An input device according to claim 1, wherein said variations are analyzed to determine the position of said object by triangulation.

5. An input device according to claim 1, wherein said coordinate axis intersects both said first side and said second side.

6. An input device according to claim 1, wherein said first and second pluralities of enemy beams comprise infrared or visible light.

\* \* \* \* \*